(12) United States Patent
Zeine et al.

(10) Patent No.: US 12,542,453 B2
(45) Date of Patent: Feb. 3, 2026

(54) SYSTEMS AND METHODS FOR PROVIDING OVER-THE-AIR POWER TO CHARGING PADS

(71) Applicant: Ossia Inc., Redmond, WA (US)

(72) Inventors: Hatem Ibrahim Zeine, Woodinville, WA (US); Eric Helzer, Woodinville, WA (US)

(73) Assignee: Ossia Inc., Redmond, WA (US)

( * ) Notice: Subject to any disclaimer, the term of this patent is extended or adjusted under 35 U.S.C. 154(b) by 608 days.

(21) Appl. No.: 18/150,926

(22) Filed: Jan. 6, 2023

(65) Prior Publication Data

US 2023/0231413 A1 Jul. 20, 2023

Related U.S. Application Data

(60) Provisional application No. 63/299,853, filed on Jan. 14, 2022.

(51) Int. Cl.
| | |
|---|---|
| *H02J 50/00* | (2016.01) |
| *A47B 21/06* | (2006.01) |
| *A47C 7/72* | (2006.01) |
| *H02J 50/20* | (2016.01) |
| *H02J 50/40* | (2016.01) |

(52) U.S. Cl.
CPC ............ *H02J 50/001* (2020.01); *A47B 21/06* (2013.01); *A47C 7/72* (2013.01); *H02J 50/005* (2020.01); *H02J 50/20* (2016.02); *H02J 50/40* (2016.02); *A47B 2021/066* (2013.01); *A47B 2220/0091* (2013.01); *H02J 2207/20* (2020.01)

(58) Field of Classification Search
CPC ...................................................... H02J 50/001
USPC ........................................................... 320/137
See application file for complete search history.

(56) References Cited

U.S. PATENT DOCUMENTS

| | | |
|---|---|---|
| 9,667,092 B2 | 5/2017 | Miller et al. |
| 10,922,408 B2 | 2/2021 | Miller et al. |
| 2011/0260681 A1 | 10/2011 | Guccione et al. |
| 2014/0167688 A1 | 6/2014 | Doyle et al. |
| 2015/0015195 A1 | 1/2015 | Leabman et al. |
| 2015/0048789 A1 | 2/2015 | Kim et al. |

(Continued)

OTHER PUBLICATIONS

International Application No. PCT/US2023/060195, International Search Report, Written Opinion, 31 pages, May 4, 2023.

*Primary Examiner* — Yalkew Fantu (57) ABSTRACT

Systems and methods for providing over-the-air power to charging pads. A system may include means for transducing over-the-air energy into electric power, at least one rechargeable battery coupled to the means for transducing, and at least one charging pad coupled to the at least one battery. The system may be positioned at least in part in at least one cavity positioned underneath a user-accessible surface of an apparatus. A method may include the steps of transducing over-the-air energy into electric power, inducing a first direct current from the electric power, transmitting the first direct current to at least one rechargeable battery, and transmitting a second direct current from the at least one rechargeable battery to at least one charging pad. Improvement of spaces used by people in need of charging various electronic devices may be achieved without such facility spaces having to undergo costly structural modifications.

25 Claims, 8 Drawing Sheets

(56) References Cited

U.S. PATENT DOCUMENTS

| | | | |
|---|---|---|---|
| 2015/0214775 A1* | 7/2015 | Lee | H02J 50/12 |
| | | | 320/137 |
| 2016/0233711 A1* | 8/2016 | Miller | H02J 7/342 |
| 2017/0077736 A1 | 3/2017 | Leabman | |
| 2017/0133889 A1 | 5/2017 | Yeo et al. | |
| 2017/0194807 A1 | 7/2017 | Zeine et al. | |
| 2017/0338684 A1* | 11/2017 | Mishriki | H04B 1/3827 |
| 2019/0052979 A1 | 2/2019 | Chen et al. | |
| 2020/0185971 A1 | 6/2020 | Moshfeghi | |

* cited by examiner

SYSTEMS AND METHODS FOR PROVIDING OVER-THE-AIR POWER TO CHARGING PADS

CROSS-REFERENCE TO RELATED APPLICATIONS

This application claims the benefit of and priority to U.S. Provisional Patent Application No. 63/299,853 filed Jan. 14, 2022, which is incorporated by reference herein in its entirety.

BACKGROUND

Electronic devices of various types are largely ubiquitous in mainstream society in many parts of the world today. Smartphones, laptops and tablet computers, among other things, are carried by many people on a daily basis during travel, meals, coffee or tea breaks, etc. Many such electronic devices have rechargeable batteries where adequate charge is necessary for their operation. These sort of devices have become crucial for daily work and/or personal activities. People often carry charging cables to charge their devices from sources like wall outlets connected to main utility electric lines of buildings and other facilities. In many cases, however, finding an available and convenient wall outlet or other wired source to charge devices may be inconvenient for people, as where there are already people using those sources for various reasons including, or instead of, charging electronic devices.

Furthermore, operators of buildings and other facilities may wish to provide their occupants or customers convenient means for charging electronic devices. In contexts ranging from airport, bus, ferry or rail terminals to restaurants, coffee shops and cafes, people may congregate in such places for various reasons like waiting for a flight, taking a break, social meetings, or doing work. During such times, people may not only wish to use electronic devices like smartphones and laptops, they may also desire or have a need to charge those devices. Facility owners, operators and designers have hitherto been largely limited to providing wired connections to locations that are accessible to people. These have included wall outlets and wired connections to furniture like tables and chairs. It may be costly and time consuming to initially, or additionally, install such wired connections in facilities to meet the demand of people for charging their electronic devices. In many cases, existing facility infrastructure must be reworked to perform activities like new wiring installations in floors and walls. This is not only costly in terms of time and money, it may also cause extensive disruption to business activities and cause inconvenience to customers. The same considerations apply in homes and offices.

In addition to wired sources like power plug outlets and USB ports for charging electronic devices, charging pads such as those using the Qi standard for wireless power transfer using inductive charging over distances of up to 4 cm (1.6 inches) at 5-15 Watts (W) are becoming increasingly prevalent in facilities. Known systems and methods for charging electronic devices using charging pads rely on wired connections. Where such charging pads are incorporated into furniture, countertops, or other portions of facilities and buildings, they are typically reliant on wired connections to mains utility lines. As such, the aforementioned considerations and drawbacks as with other wired charging sources like power outlets and USB ports apply for both facility owner/operators and customers/people more generally.

Accordingly, a need exists for technology that overcomes the problems demonstrated above, as well as one that provides additional benefits. The examples provided herein of some prior or related devices, systems and methods, and their associated limitations, are intended to be illustrative and not exclusive. Other limitations of existing or prior systems will become apparent to those of skill in the art upon reading the following detailed description.

SUMMARY

Systems and methods for providing over-the-air power to charging pads. In a first aspect of the present technology, a system may include means for transducing over-the-air energy into electric power. The system may include at least one rechargeable battery coupled to the means for transducing. The system may include at least one charging pad coupled to the at least one battery. The system may be positioned at least in part in at least one cavity positioned underneath a user-accessible surface of an apparatus.

In a first embodiment according to the first aspect of the present technology, the means for transducing may include at least one radio frequency (RF) antenna. In a second embodiment according to the first aspect of the present technology, the system may include an energy harvester circuit to convert an AC current from the at least one RF antenna to a DC current for transmission to the at least one battery.

In a third embodiment according to the first aspect of the present technology, or in the aforementioned first and/or second embodiments thereof, the system may include at least one outlet coupled to the at least one battery. In a fourth embodiment according to the first aspect of the present technology, the system may include at least one power converter coupled to and between the at least one battery and the at least one outlet.

In a fifth embodiment according to the first aspect of the present technology, or in any one or more of the aforementioned first through fourth embodiments thereof, the system may include at least one power converter coupled to and between the at least one battery and at least one charging pad.

In a second aspect of the present technology, an apparatus may include at least one surface accessible by a user during use of apparatus. The apparatus may include at least one cavity positioned underneath the at least one surface. The apparatus may include the system according to the first aspect of the present technology positioned at least in part in the at least one cavity.

In a first embodiment according to the second aspect of the present technology, the means for transducing includes at least one RF antenna. In a second embodiment according to the second aspect of the present technology, the system may include an energy harvester circuit to convert an AC current from the at least one RF antenna to a DC current for transmission to the at least one battery.

In a third embodiment according to the second aspect of the present technology, or in the aforementioned first and/or second embodiments thereof, the apparatus may include at least one outlet coupled to the at least one battery. In a fourth embodiment according to the second aspect of the present technology, the system may include at least one power converter coupled to and between the at least one battery and the at least one outlet.

In a fifth embodiment according to the second aspect of the present technology, or in any one or more of the aforementioned first through fourth embodiments thereof, the system may include at least one power converter coupled to and between the at least one battery and at least one charging pad. In a sixth embodiment according to the second aspect of the present technology, or in any one or more of the aforementioned first through fifth embodiments thereof, the at least one cavity may include a technology layer.

In a seventh embodiment according to the second aspect of the present technology, or in any one or more of the aforementioned first through sixth embodiments thereof, the apparatus may include at least one piece of furniture. In an eighth embodiment according to the second aspect of the present technology, the at least one piece of furniture may include a chair. In a ninth embodiment according to the second aspect of the present technology, the at least one surface may include at least one armrest of the chair. In a tenth embodiment according to the second aspect of the present technology, the at least one piece of furniture may include a table. In an eleventh embodiment according to the second aspect of the present technology, the at least one surface may include a tabletop.

In a twelfth embodiment according to the second aspect of the present technology, or in any one or more of the aforementioned first through eleventh embodiments thereof, the apparatus may include a countertop. In a thirteenth embodiment according the second aspect of the present technology, the at least one surface may include the countertop.

In a fourteenth embodiment according to the second aspect of the present technology, or in any one or more of the aforementioned first through thirteenth embodiments thereof, the apparatus may include an accessory, which may be an accessory for furniture. In a fifteenth embodiment according to the second aspect of the present technology, the accessory may be include lazy susan. In a sixteenth embodiment according to the second aspect of the present technology, the accessory may include a tablecloth.

In a seventeenth embodiment according to the second aspect of the present technology, or in any one or more of the aforementioned first through sixteenth embodiments thereof, the apparatus may include a shelf. In an eighteenth embodiment according to the second aspect of the present technology, or in any one or more of the aforementioned first through seventeenth embodiments thereof, the apparatus may include a windowsill.

In a nineteenth embodiment according to the second aspect of the present technology, or in any one or more of the aforementioned first through eighteenth embodiments thereof, the at least one surface may include a generally flat surface. In a twentieth embodiment according to the second aspect of the present technology, or in any one or more of the aforementioned first through nineteenth embodiments thereof, the at least one surface may include a generally upwardly facing surface.

In a third aspect of the present technology, a method may include the step of transducing over-the-air energy into electric power. The method may include the step of inducing a first direct current (DC) from the electric power. The method may include the step of transmitting the first DC current to at least one rechargeable battery. The method may include the step of transmitting a second DC current from the at least one rechargeable battery to at least one charging pad.

In a first embodiment according to the third aspect of the present technology, the method may include the step of charging, using the at least one charging pad, a battery of an electronic device.

In a fourth aspect of the present technology, a method of manufacturing an apparatus may include the step of forming at least one cavity underneath at least one surface of the apparatus. The method of manufacturing an apparatus may include the step of positioning the system according to the first aspect of the present technology, or the system according to one or more of the aforementioned first through fifth embodiments thereof, at least in part in the at least one cavity. The method according to the fourth aspect of the present technology may be advantageously practiced without undue experimentation to retrofit, or fabricate anew, an apparatus according to the second aspect of the present technology, or any one or more of the first through twentieth embodiments thereof.

Embodiments of the present technology shown and described herein may enable improvement of spaces used by people in need of charging various electronic devices may be achieved without such facility spaces having to undergo costly structural modifications.

DETAILED DESCRIPTION

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a computer processor or controller. Dedicated hardware implementations including, but not limited to, application specific integrated circuits, programmable logic arrays, system-on-chip (SoC), circuit logic, and other hardware devices can likewise be constructed to implement the circuits, functions, processes, and methods described herein. Methods and functions may be performed by modules or engines, both of which may include one or more physical components of a computing device (e.g., logic, circuits, processors, controllers, etc.) configured to perform a particular task or job, or may include instructions that, when executed, can cause a processor to perform a particular task or job, or may be any combination thereof. Further, the methods described herein may be implemented as a computer readable storage medium or memory device including instructions that, when executed, cause a processor to perform the methods.

Figure 1:
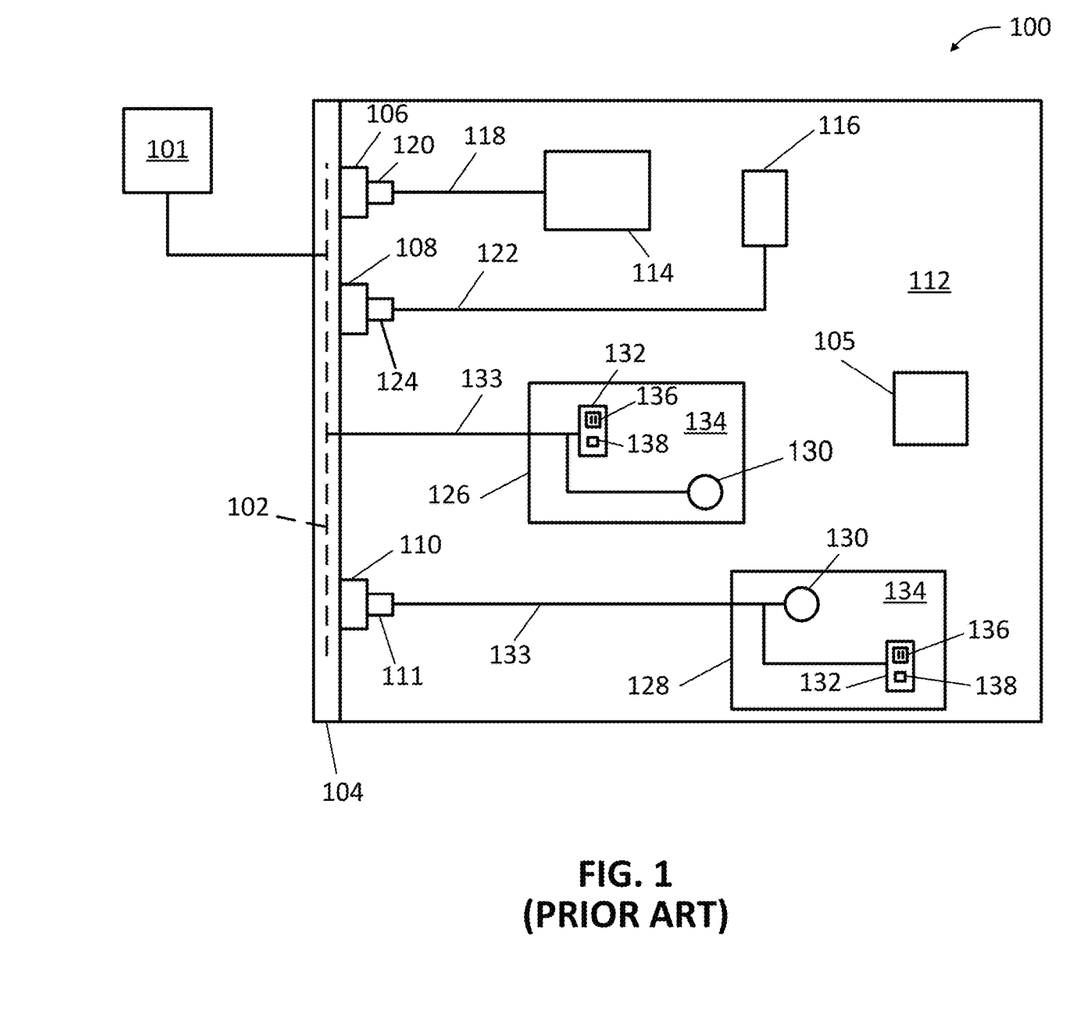
FIG. 1 depicts a plan view of a known facility where people using or otherwise possessing electronic devices requiring electric power for operation and/or charging may be situated.

FIG. 1 depicts a plan view of a known facility 100 where people using or otherwise possessing electronic devices requiring electric power for operation and/or charging may be situated. Facility 100 includes an electric power source 101, such as a utility grid and/or renewable energy source like a photovoltaic array with associated circuitry and components. Power source 101 is coupled to a main electric line 102 of facility 100, which may be situated in one or more walls 104 or one or more posts/stanchions 105 of facility. Several means for providing electric power to operate and/or charge electronic devices are present in facility 100 and are coupled via wired connections to line 104. In the example illustrated in FIG. 1, facility includes first 106, second 108, and third 110 power outlets, each of which is wired to the main electric line 102. People situated on a floor 112 of facility may have a laptop 114 and/or a smartphone 116, each of which include a rechargeable battery. A first person having laptop 114 may desire to charge its battery. To do so, the first person connects a power cord 118 having a plug 120 to the first power outlet 106 having a mating port. Similarly, a second person having smartphone 116 can connect a power cord 122 having a USB plug 124 to the second power outlet 108 having a mating USB port.

Facility 100 may include various pieces of furniture and/or countertop space situated on floor 112. These can have flat surfaces disposed on at least a portion thereof. For example, facility 100 can include a table 126 having a flat top surface 134 and a chair 128 having two armrests with respective flat top surfaces 134.

Table 126 includes components for delivery of electric power to electronic devices (e.g., laptop 114 and/or smartphone 116). Such components are wired, via cord 133, directly to main line 102. For aesthetic, safety and other practical purposes, an underfloor conduit (not shown in FIG. 1) may be used for this purpose. At least one outlet 132 is situated on surface 134 and can include AC 136 and USB 138 ports coupled to cord 133. At least one charging pad 130 (e.g., Qi) is also situated on surface 134 and is coupled to cord 133. People can thus operate and/or charge their electronic device(s) while at table 126 using outlet(s) 132 and/or charging pad(s) 130 that are drawing power from main line 102 via wired connection.

Chair 128 also includes components for delivery of electric power to electronic devices (e.g., laptop 114 and/or smartphone 116). Such components are wired, via cord 133, to main line 102 via outlet 110 and a mating plug 111 at an end of cord 133. For safety and aesthetic reasons, for example, chair 128 may be positioned close to wall 104 on facility 100 floor 112, which may limit the usefulness of chair 128 for occupants of facility 100. One or both armrests of chair 128 can include the components (e.g., 130, 132, 136 and 138) situated on their surfaces 134, in like manner as described above for table 126.

Figure 2:
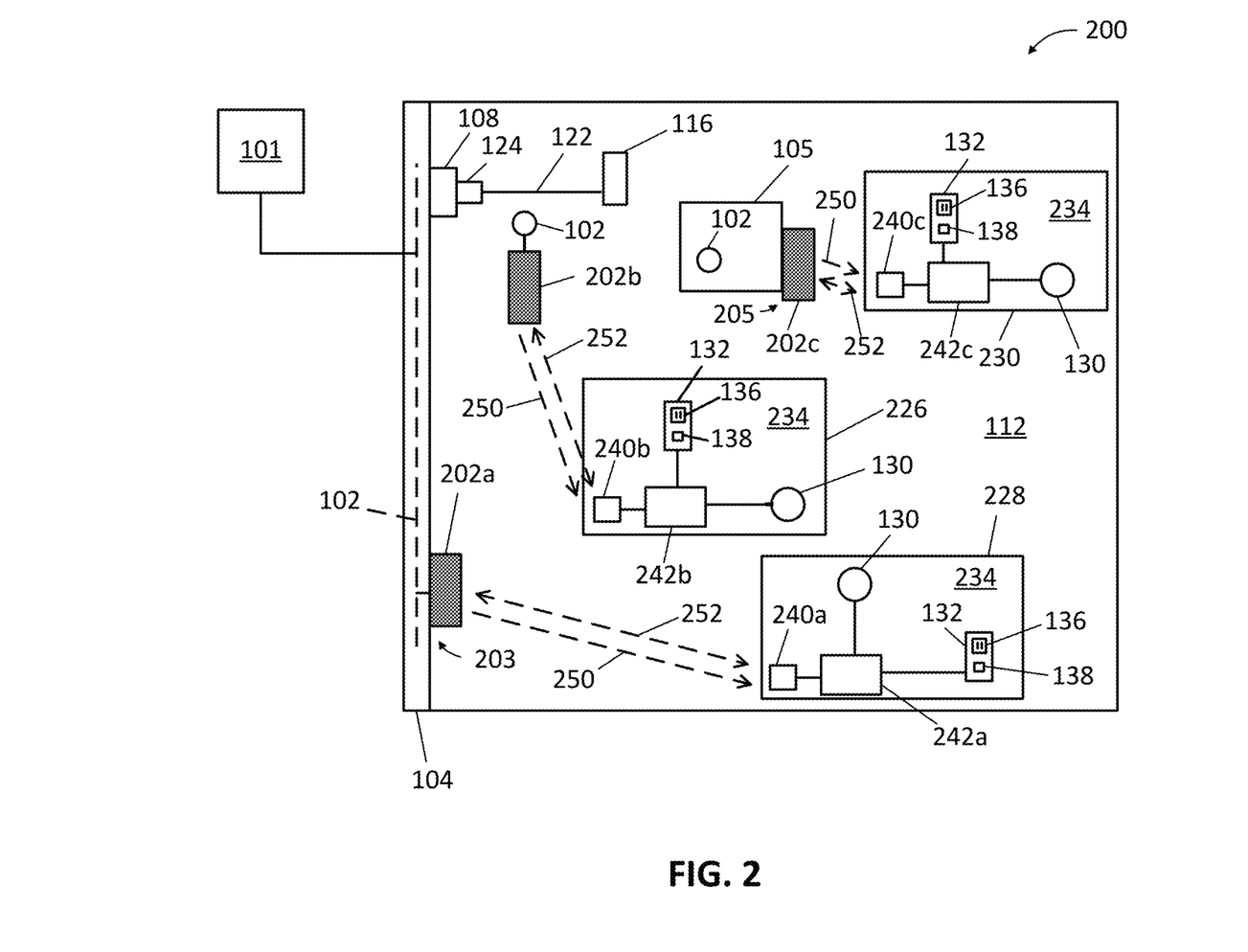
FIG. 2 depicts a plan view of a facility where people using or otherwise possessing electronic devices requiring electric power for operation and/or charging may be situated, in accordance with certain embodiments of the present technology.

FIG. 2 depicts a plan view of a facility 200 where people using or otherwise possessing electronic devices requiring electric power for operation and/or charging may be situated, in accordance with certain embodiments of the present technology. Aspects of facility 100 described above with reference to FIG. 1 are included in FIG. 2 for context and to demonstrate a general concept that the present technology may be used either instead of, or in addition to, aspects and component parts described above with reference to FIG. 1.

Facility 200 may include power source 101, main electric line 102, wall(s) 104, post(s)/stanchion(s) 105, outlet 108 and floor 112. Facility 200 may include one or more sources of over-the-air (e.g., wireless) power 202. Three such sources (202a, 202b and 202c) are shown in FIG. 2. A first source of power 202a may be positioned in facility 200 on a part of wall 104, such as at a juncture 203 of wall 104 and a ceiling of facility 200 opposite floor 112. A second source of power 202b may be positioned in facility 200 on the ceiling of facility 200. A third source of power 202c may be positioned in facility 200 on a part of post/stanchion 105, such as at a juncture 205 of post/stanchion 105 and the ceiling of facility 200. In the embodiment shown in FIG. 2, first 202a, second 202b and third 202c sources of power are, or include, radio frequency (RF) wireless power transmitters (WPTs) that are coupled to main electric line 102 of facility 200. Such RF (e.g., electromagnetic)-based WPT(s) may include any one or more of the WPT(s) and associated technology (e.g., COTA®) provided by OSSIA Inc. of Redmond, WA, which may include retrodirective, beacon-based RF wireless power delivery techniques and components. Generally speaking, however, the source(s) of power 202 according to the present technology may be, or may include, any hardware and/or software/firmware components capable of providing over-the-air power delivery to locations positioned some finite distance from such source(s) 202. Thus, in other embodiments not shown in FIG. 2, one or more of the sources of power 202 may be, or include, and in addition to, or instead of RF-based WPT technology, infrared (IR), laser, light, ultrasound, magnetic field only, and vibration, based over-the-air power delivery. A person having ordinary skill in the art may be expected to recognize and appreciate that additional known, or as yet unknown, over-the-air power delivery-related devices, systems and methods in addition to the aforementioned listing may be utilized and/or adapted for use with the present technology.

Facility 200 may include various pieces of furniture and/or countertop space situated on floor 112. These can have flat surfaces disposed on at least a portion thereof. For example, facility 200 can include a table 226, a chair 228, and a countertop 230, each of which having a flat top surface 234 on at least a portion thereof. Table 226, chair 228, and countertop 230 may each respectively include a power receiver 240 coupled to a rechargeable battery 242. In some embodiments, an over-the-air power receiver 240 and a battery 242 may be situated underneath a portion of surface 234. As shown in FIG. 2, for example, table 226 includes receiver 240a coupled to battery 242a, chair 228 armrest(s) include receiver 240b coupled to battery 242b, and countertop 230 includes receiver 240c coupled to battery 242c. Other configurations are possible according to the present technology. In another example, receiver 240 and/or battery 242 may be positioned on the top of surface 234. In yet another example, receiver 240 and/or battery 242 may be embedded within a material of construction that includes the surface 234.

Table 226, chair 228 and countertop 230 may each respectively include components for delivery of electric power to electronic devices (e.g., laptop 114 and/or smartphone 116). As compared to facility 100, however, in facility 200 according to the present technology, such components need not be wired to main line 102. Each of table 226, chair 228 and countertop 230 may each include AC 136 and USB 138 port(s), along with at least one charging pad 130 (e.g., Qi), situated on surface 134 and coupled to battery 242. In some embodiments, the port(s) (136 and/or 138) and/or the charging pad(s) 130 may additionally be coupled to receiver 240.

Facility 200 may represent a wide variety of physical environments. These may include, for example, and without limitation, coffee shops, cafes, restaurants, libraries, airport gate areas, conference rooms, and schools. Practical considerations may dictate the numbers of components and their specifications to be included in the furniture (e.g., 226,228 and/or 230) of facility 200. A large table 226, or a large countertop 230, intended for use by multiple people may include a plurality of instances of receiver 240, battery 242, port(s) (136 and/or 138) and charging pad 230. By contrast, a small table 226, a small countertop 230, or a single chair 228, intended for use by just one or two people may include just one instance each of receiver 240, battery 242, port(s) (136 and/or 138) and charging pad 230. Likewise, a number of sources of power 202 to include in facility 200 may depend on size, a number of pieces of furniture and/or countertops included therein, and/or volume of people of/in facility 200. While three sources of power 202 (e.g., 202a, 202b and 202c) are shown in FIG. 2, a small facility 200 space or one expected to have a smaller number of people with electronic devices in need of electric power may include only one source of power 202.

In one embodiment of the present technology, source of power 202 include hardware and/or software/firmware components that are capable of delivering a signal 250 (or other means of transmitting energy transduce-able into electric power over-the-air) for receipt by receiver 240. For various useful purposes, to be described, source of power 202 may also include hardware and/or software/firmware components that are capable of receiving from receiver 240 a signal 252 encoding data. In the example of FIG. 2, source of power 202 further includes hardware and/or software/firmware components that are capable of transmitting the signal 252 from source of power 202 to receiver 240 to thereby enable bidirectional wireless data transmission between source 202 and receiver 240.

Although FIG. 2 shows a ratio of one source of electric power 202 for each of table 226, chair 228 and countertop 230, just one source of power 202 could deliver over-the-air power to multiple receivers 240 of multiple pieces of furniture and/or countertop(s).

It can be readily appreciated that facility 200 as described above with reference to FIG. 2 represents a substantial improvement as compared to the known facility 100 described above with reference to FIG. 1. Safety and ergonomic advantage are improved by virtue of eliminating the need for use of wired cables and connections to and between furniture and countertop(s) and main electric line 102. Furthermore, furniture is now fully moveable without any concern whatsoever for locations of outlets in facility 200, thereby greatly increasing the utility and potential for enjoyment of the space by people. Moreover, the present technology facilitates providing means for providing electric power to numerous devices of varying types without having to perform costly and time consuming physical modifications to facility 200. Rather, source(s) of power 202 may simply by installed with ease to thereby provide over-the-air power delivery to receiver(s) 240 incorporated into furniture, countertop(s) and/or other fixtures/accessories in facility 200.

Figure 3A:
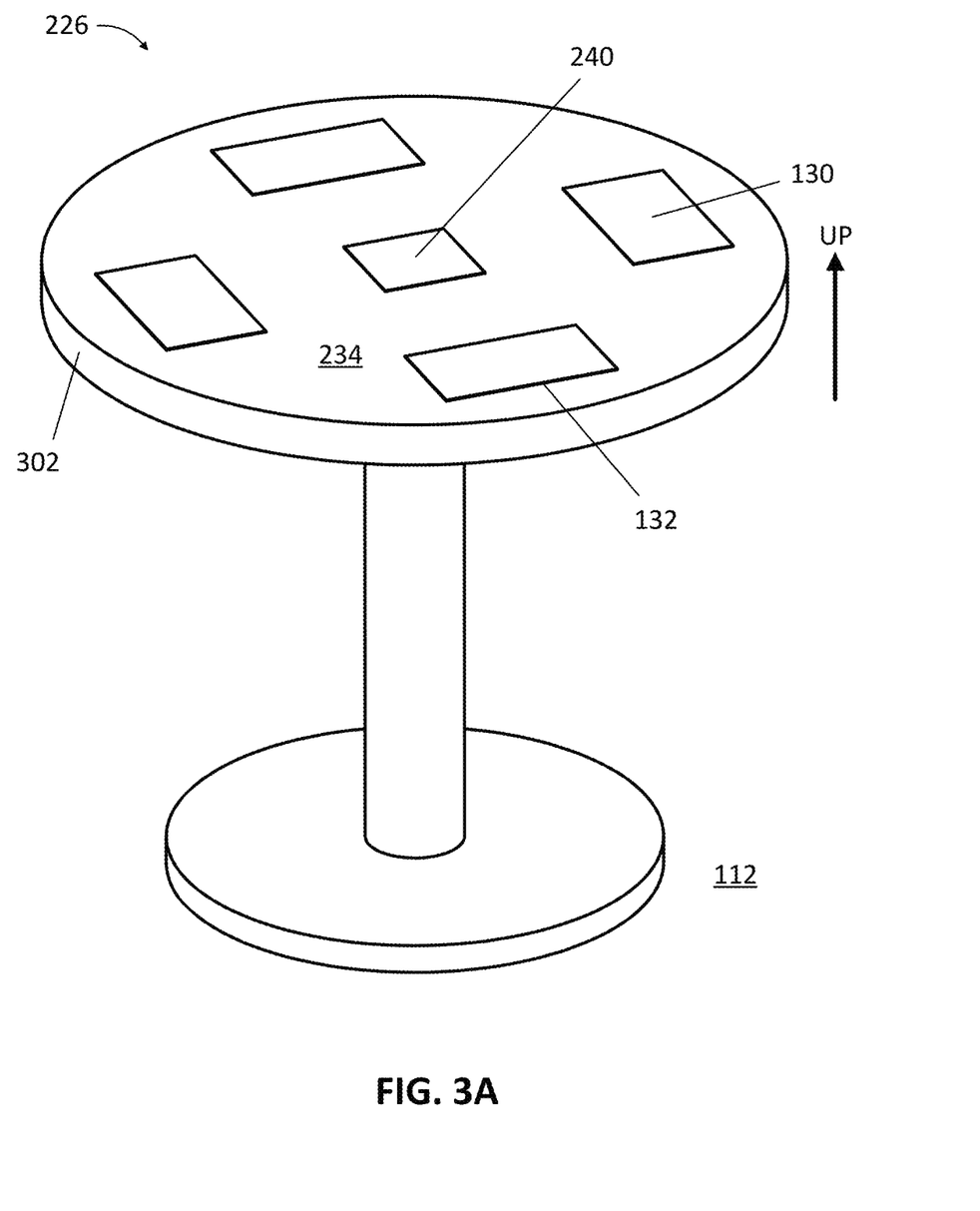
FIG. 3A depicts a top to bottom perspective view of a table that may be used in the facility shown in FIG. 2, in accordance with certain embodiments of the present technology.

FIG. 3A depicts a top to bottom perspective view of table 226 that may be used in facility 200 shown in FIG. 2, in accordance with certain embodiments of the present technology. The illustrated example is table 226 having circular top surface 234 bounded at its circumference by an edge 302. As will be appreciated, table 226 may instead have any practical shape for its top surface 234, such as square, rectangular, ovoid, trapezoidal, triangular, or other polygonal shapes. In the example shown in FIG. 3A, power receiver 240 may be situated on or underneath a portion of surface 234, and may be coupled to battery 242, as described above with reference to FIG. 2. Also situated on surface 234 of table 226 are at least one outlet 132 and at least one charging pad 130, each of which being coupled to battery 242 and/or power receiver 240. For pads 130, charging locations may be marked with visible outlines marked and/or formed on surface 234.

Similar to table 226 shown in FIG. 3A, flat surfaces of at least parts of other types of furniture, counters, fixtures, and accessories may be similarly configured according to the present technology. In addition to armrest(s) of chairs (e.g., 228) and countertop(s) (e.g., 230), surface(s) 234 of such useful items as shelves, drawers, sofas, dressers, desks, as well as accessories like lazy susans and racks, may be fabricated or otherwise adapted for use with the present technology. With inclusion of the present technology in racks or lazy susans, users may enjoy charging of electronic devices without any wired connections between furniture and wall outlets, and also without having to modify existing furniture, countertops and the like. A person having ordinary skill in the art may be expected to recognize and appreciate that surfaces 234 of additional known, or as yet unknown, types of furniture, fixtures and/or accessories in addition to the aforementioned listing may be utilized and/or adapted for use with the present technology.

Figure 3B:
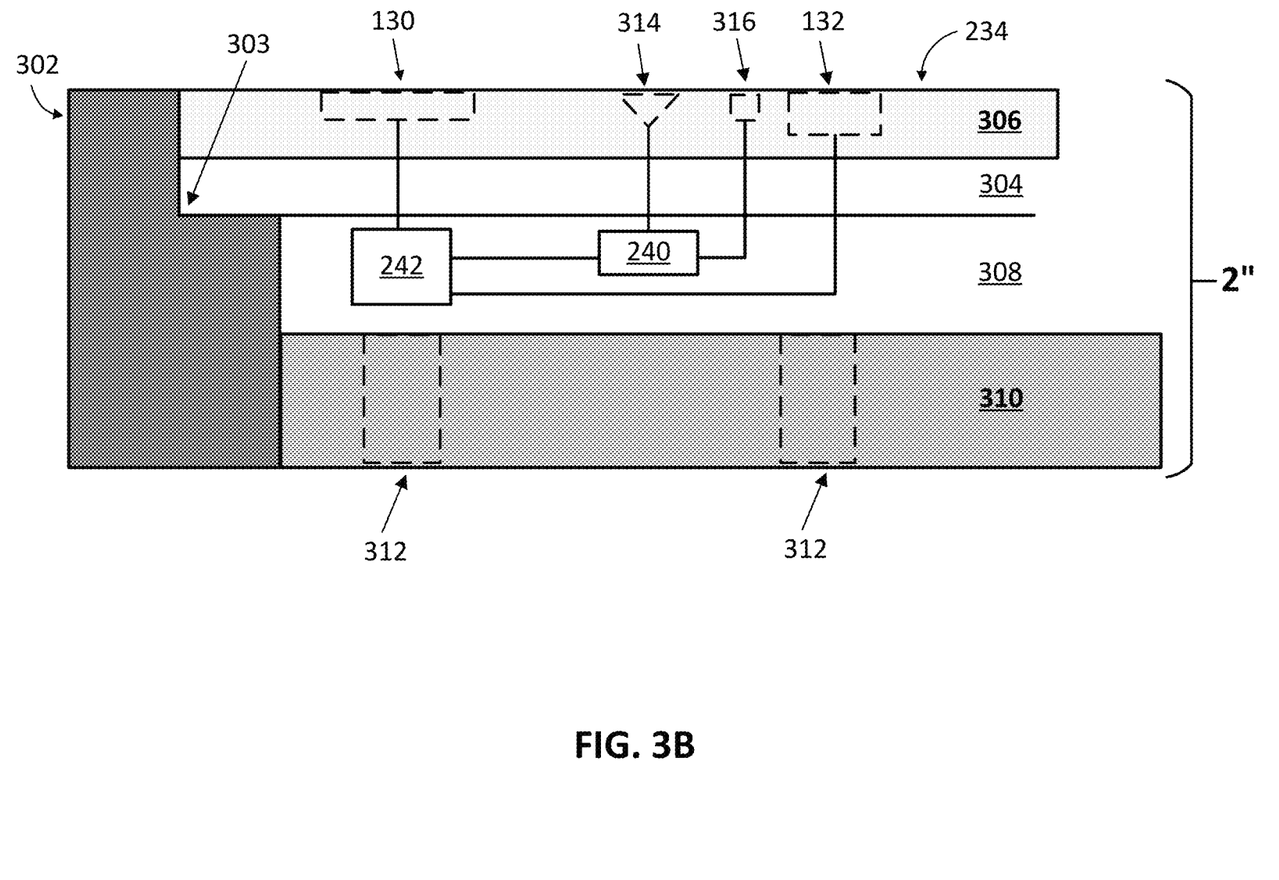
FIG. 3B depicts a cross-sectional view of a portion of a piece of furniture, countertop, or accessory including a technology layer that may be used in the facility shown in FIG. 2, in accordance with certain embodiments of the present technology.

FIG. 3B depicts a cross-sectional view of a portion of a piece of furniture, countertop, or accessory including a technology layer 308 that may be used in facility 200 shown in FIG. 2, in accordance with certain embodiments of the present technology. In the case of table 226, edge 302 may form a framed perimeter for top surface 234. In one example, edge 302 may have a height of two inches. An inner diameter (or perimeter) of edge 302 may have a ledge 303. A panel shaped and dimensioned to mate with ledge 303 may be coupled or otherwise disposed onto ledge 303. In the example shown in FIG. 3B, a finished wood (e.g., walnut) panel 304 is in contact with ledge 303, and a glass panel 306 rests upon panel 304. Technology space 308 may be situated between panel 304 and a lower panel 310, thereby forming an interior cavity within which receiver(s) 240, at least one battery 242, and associated components may be placed. In some embodiments, technology space 308 may be weatherproofed and/or made water resistant by sealing boundaries between the inner perimeter of edge 302 and outer diameters (or perimeters) of panels 304, 306 and 310. This may enable implementation and enjoyment of the present technology in outdoor environments where precipitation may be expected from time to time.

In some embodiments, lower panel 310 may have one or more holes 312 formed in the lower layer 310 for purposes of cooling electronics within technology space 308. At least some of the components (e.g., power receiver 240 and battery 242) described above with reference to FIG. 2 according to the present technology may be positioned in technology space 308. As shown in FIG. 3B, at least one outlet 132 and at least one charging pad 130 may be situated on or within layer 306 to be accessible for use from an exterior of, for example, table 226. At least one means 314 for transducing over-the-air energy to electric power 314 (e.g., RF antenna(s) for use with WPT(s)) may be situated on or within layer 306. In another embodiment (not shown in FIG. 3B), means 314 may be positioned in technology layer 308 either instead of, or in addition to, being situated on or within layer 306.

In one embodiment, at least one means 316 coupled to a controller or processor of power receiver 240 for indicating to a person whether or not outlet(s) 132 and/or charging pads 130 are operational and available for use for delivering electric power to electronic devices for operation and/or charging purposes. Means 316 may include, or be embodied in, an LED light that is visible to a person from an exterior (e.g., top facing) portion of surface 234. In one embodiment, the LED light may be energized (e.g., illuminated with a red color) during such times when the outlet(s) 132 and/or charging pads 130 are not operational and not available for use. In another embodiment where surface 234 includes a plurality of charging pads 130 and/or outlets 132, means 316 may include at least one LED light per instance to show one or both of the location of pads 130 and/or outlets 132, and their operational statuses. Such means 316 for indicating may be capable of being visible to a person even when surface 234 is covered by, for example, a tablecloth.

Figure 4:
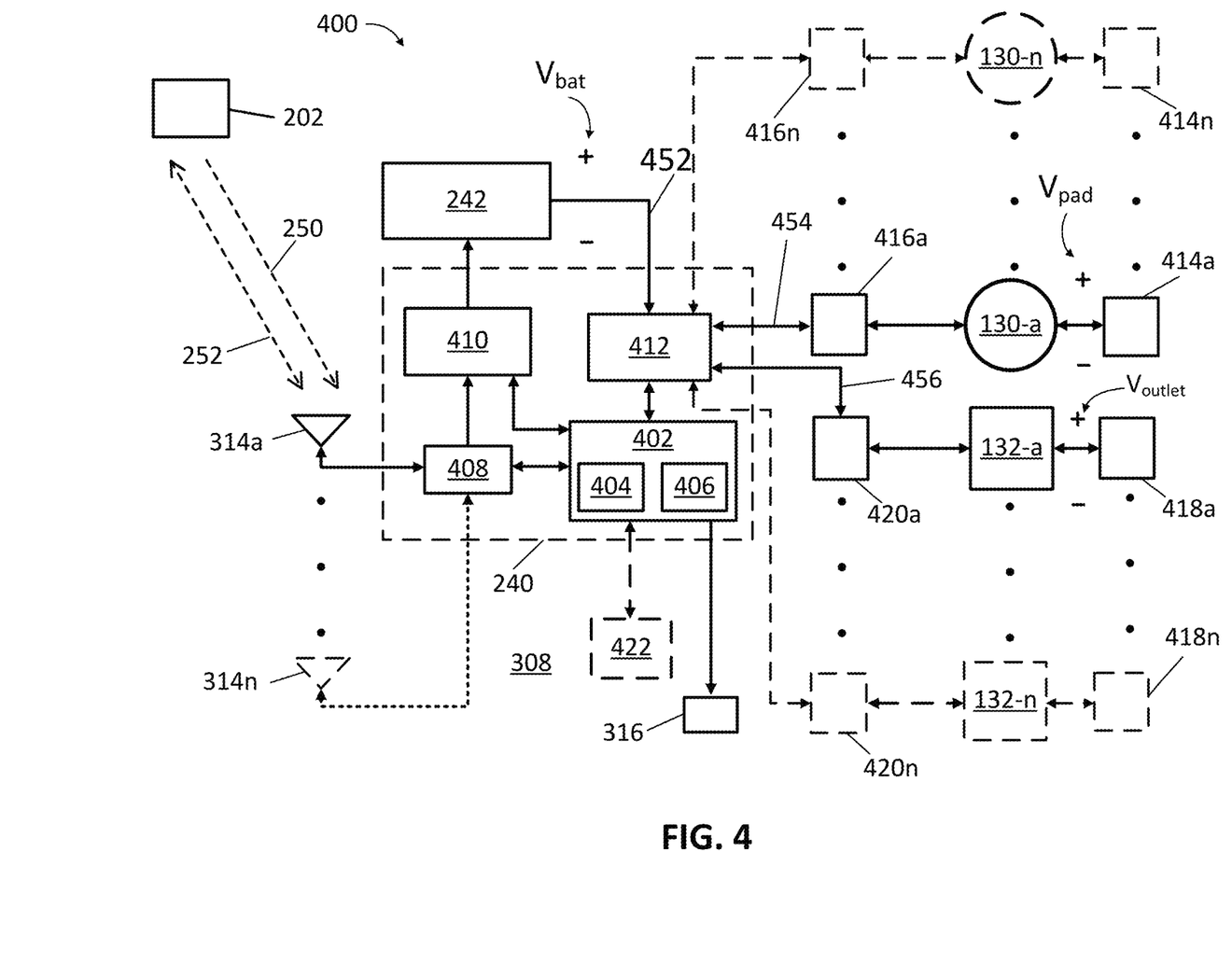
FIG. 4 depicts a system that may be positioned in the technology layer shown in FIG. 3B for use in the facility shown in FIG. 2, in accordance with certain embodiments of the present technology.

FIG. 4 depicts a system 400 that may be positioned in the technology layer 302 shown in FIG. 3B for use in facility 200 shown in FIG. 2, in accordance with certain embodiments of the present technology. At least a portion of system 400 may be positioned in the technology layer 308, as shown in FIG. 3B. System 400 includes over-the-air power receiver 240. Receiver 240 includes a controller 402. Controller 402 may include a memory storage device 404 and a communications interface 406. Communications interface 406 may include circuitry under control of controller 402 to generate an RF signal (e.g., beacon) for transmission using RF antenna means 314 to a wireless power delivery environment which may contain the WPT 202. A power amplifier (not shown in FIG. 4) may amplify this RF signal to facilitate its transmission to, and receipt by, WPT 200.

Controller 402 may be embodied in, or may include, hardware circuits (e.g., application specific integrated circuits (ASICs), logic circuits, software, computer(s), microprocessor(s), microcontroller(s), field programmable gate array(s), or any combination thereof, and can be configured to provide control and intelligence to the components of system 400. In embodiments where controller 402 is or includes a computer, processor, microcontroller, and the like, controller 402 may include or be coupled, or couplable, to the memory storage device 404 (also referred to herein as memory 404). Memory 404 may include one or more non-transitory computer readable media (e.g., ROM, EEPROM and/or Flash-type) to store as, for example, firmware or software, program instructions executable by controller 402 for implementing, or otherwise enabling or facilitating, the processes and methods described herein according to the present technology.

System 400 includes at least one means 314 for transducing over-the-air energy to electric power 314 (e.g., RF antenna(s) for use with WPT(s)). In embodiments where over-the-air power delivery is an RF wireless power signal transmitted from at least one WPT 202 to power receiver 240, means 314 include one or more RF antennas, which may be arranged as multiple antennas (e.g., 314a, . . . , 314n) of an antenna array. In some embodiments, the multiple antennas may be positioned at disparate locations on or proximate to surface 234.

Power receiver 240 includes at least one switch 408 coupled to and between controller 402 and the at least one means 314 for transducing over-the-air energy to electric power 314. In embodiments where means 314 include at least one RF antenna, switch 408 may enable each instance of RF antenna means 314 to alternate between receive mode and transmit mode. In receive mode, RF antenna means 314 can receive the RF-based wireless power signal from WPT 202 (e.g., signal 250). Receive mode may also enable RF antenna means 314 to receive an RF-based communication signal (e.g., signal 252) encoding data pertaining to various things about, for example and without limitation, an operational status of WPT(s) 202 for transmitting wireless power over-the-air to receiver 240. In transmit mode, RF antenna means 314 can transmit the RF-based communication signal (e.g., signal 252) encoding data pertaining to various things about, for example and without limitation, charge status, level, and health of battery 242, identification, charge level, power flow to, and operational status of devices (e.g., smartphone(s) 414a, . . . , 414n using charging pad(s) 130a, . . . , 130n and/or cell phone(s) 418a, . . . , 418n using outlet(s) 132a, . . . , 132n).

Switch 408 may be coupled to an energy harvester circuit 410. In the receive mode for means 314, for example, an electric current generated by means 314 may be transmitted to the energy harvester circuit 410. Such a current may be an alternating current (AC) and energy harvester circuit 410 may include hardware and/or software/firmware components to rectify or otherwise convert the AC electric current to a direct current (DC). Energy harvester circuit 410 may be coupled to at least one battery 242 of system 400. Transmission of DC current from energy harvester circuit 410 to battery 242 may be utilized for charging battery 242 for use in the present technology.

Power receiver 412 may include a power converter 412 coupled to battery 242. Power converter 412 may also be coupled to controller 402 to facilitate control of converter 412 by controller 402. Power converter 412 may contain circuitry to convert and/or condition a DC current 452 (e.g., at a first voltage $V_{bat}$) to, for example a DC current 454 at a second voltage ($V_{pad}$) to charge a smartphone 414 using charging pad 130. Power converter 412 may also contain circuitry to convert and/or condition DC current 452 to, for example a DC current 456 at a third voltage ($V_{outlet}$) to charge a cell phone 418 using outlet 132. System 400 may further include means 316, as discussed above with reference to FIG. 3B.

In some embodiments, system 400 may include at least one charge pad controller (e.g., 416a, . . . , 416n) coupled to and between each charging pad 130 and power converter 412. In another example, system 400 includes one converter (e.g., 412a, . . . , 412n) for each of a plurality of charging pads (e.g., 130a, . . . , 130n), where respective charge pad controllers (e.g., 416a, . . . , 416n) may be coupled to and between respective converters (e.g., 412a, . . . , 412n) and charging pads (e.g., 130a, ..., 130n). In yet another example, a single charge pad controller 416 may be coupled to and between multiple charge pads (e.g., 130a, ..., 130n) and power converter 412. In still another example, charge pad controller(s) 416 may be coupled to and between charging pad(s) 130 and controller 402, either instead of, or in addition to, being coupled to and between power converter(s) 412 and charging pad(s) 130.

In some embodiments, system 400 may include at least one outlet controller (e.g., 420a, ..., 420n) coupled to and between each outlet 132 and power converter 412. In another example, system 400 includes one converter (e.g., 412a, ..., 412n) for each of a plurality of outlets (e.g., 132a, ..., 132n), where respective outlet controllers (e.g., 132a, ..., 132n) may be coupled to and between respective converters (e.g., 412a, ..., 412n) and outlets (e.g., 132a, ..., 132n). In yet another example, a single outlet controller 420 may be coupled to and between multiple outlets (e.g., 132a, ..., 132n) and power converter 412. In still another example, outlet controller(s) 420 may be coupled to and between outlet(s) 132 and controller 402, either instead of, or in addition to, being coupled to and between power converter(s) 412 and outlet(s) 132.

In operation, approximately 4 W of electric power may be delivered, on average, from a WPT 200 to power receiver 240 when using the COTA® technology of OSSIA Inc. Higher power levels for transmission and conversion of such wireless power signals may be expected in the future. Nevertheless, the transduction of various types of over-the-air energy into electric power for use by system 400 may only provide a power flow out of system 400 that is not sufficient to achieve a full charging rate for modern electronic devices such as smartphones 414. Accordingly, operation of system 400 may advantageously use the one or more batteries 242 to provide a source of electric power that can be converted/conditioned by power converter 412 to increase charging rates and thereby charge electronic devices connected to system 400 at a rate that users find acceptable as compared to, for example, wired AC outlets (e.g., 108). In the same vein, charging pads 130 (e.g., Qi-based) may require higher voltage and power flow (e.g., 15 W) as compared to outlets 132 of system 400.

During such times that facility 200 is not being used or is experiencing less people traffic, battery 242 of system 400 may be charged to a full level, or to a level that is appropriate for a specific type or chemistry of battery 242. During higher traffic times of the day, source of power 202 can monitor the battery charge level and delivery over-the-air power to receiver 420 to maintain the charge level of battery 242 at an appropriate (e.g., predetermined) charge level, or within a range of charge levels, so as to facilitate continuous operation of system 400 according to the present technology. More or fewer battery 242 capacity may be included in each instance of system 400 to meet expected use demands of system 400. Similarly, a rate at which over-the-air power is delivered to receivers 240 can be increased during high traffic times of facility as compared to low traffic times so as to ensure continuous system 400 operation.

The embodiments according to the present technology enable a practical and flexible solution for users of system 400 for a wide array of electronic devices, charging modalities, and use cases. Embodiments of the present technology therefore accommodate use cases where it may be expected that over-the-air power deliver may not be necessarily constant through the use of system 400, and enables effective management of components of system 400 and source(s) of power 202 to facilitate prevention, or at least mitigation of, operational interruptions.

In a first use case for system 400, controller(s) 416 and/or 420 may include hardware and/or software/firmware to meter power flow delivered via charging pad(s) 130 and/or outlet(s) 132. Metering data may include Watt-hours (Wh) or derivative data denoting an amount of electric power delivered to particular devices for their charging or operation using system 400 according to the present technology. A user (e.g., business like a coffee shop) may charge money for such power delivery using system 400. To accomplish monetization of use of system 400, controller(s) 416 and/or 420 may also derive identifying information pertaining to electronic devices (e.g., smartphone 414 and/or cell phone 418) including, for example and without limitation, data representative of a name or other identifier of an owner of a device. Thus, metering data and identifying information can be associated for purposes of a device owner being charged money for the use of system 400 according to the present technology.

In the first use case, computation of charged amounts may be done by controller 402 after it receives the aforementioned metering data and identifying data. In one example according to the first use case, controller 402 may utilize communication interface 406 to transmit signal(s) encoding data representative of charged amounts to an external computing/communication system 422 associated with the owner or operator of facility 200 in which system 400 is located. That owner/operator of facility 200 may then take any necessary steps to accomplish collection of the charged amounts from a device owner who drew electric power from system 400 according to the present technology. In another example according to the first use case, the aforementioned metering data and identifying data may be relayed to the external computing/communication system 422 for computation of charged amounts.

In a second use case for system 400, controller 402 of system may utilize communications interface 406 to receive from the external computing/communication system 422 signal(s) encoding data representative of a customer status (e.g., premier vs. regular member status) of the owner/operator of facility 200. These data may be utilized by controller 402 and/or controller(s) 416 and/or 420 to adjust operation of system 400 according to the statuses of respective customers charging or operating their electronic devices using system 400 according to the present technology. In one example according to the second use case, a premier customer may receive a higher electric power flow rate from charging pad 130 and/or outlet 132 to enable faster charging of their respectively owned electronic device(s). A regular customer would receive a comparatively lower electric power flow rate from charging pad 130 and/or outlet 132 and thus enjoy a comparatively slower rate of charge for their respectively owned electronic device(s). In another example according to the second use case, a premier customer may be enabled to charge their respectively owned electronic device to a full charge level using system 400. A regular customer would only be enabled to charge their respectively owned electronic device to less than a full charge level (e.g., less than 100% charge level) using system 400. The first and second use cases illustrate how system 400 as used, for example and without limitation, facility 200 may enable monetization of device charging for owners/operators of businesses like coffee shops and airlines in a manner that would be largely impractical, or even impossible, using strictly wired electrical line (e.g., 102)-based charging equipment and techniques.

Figure 5:
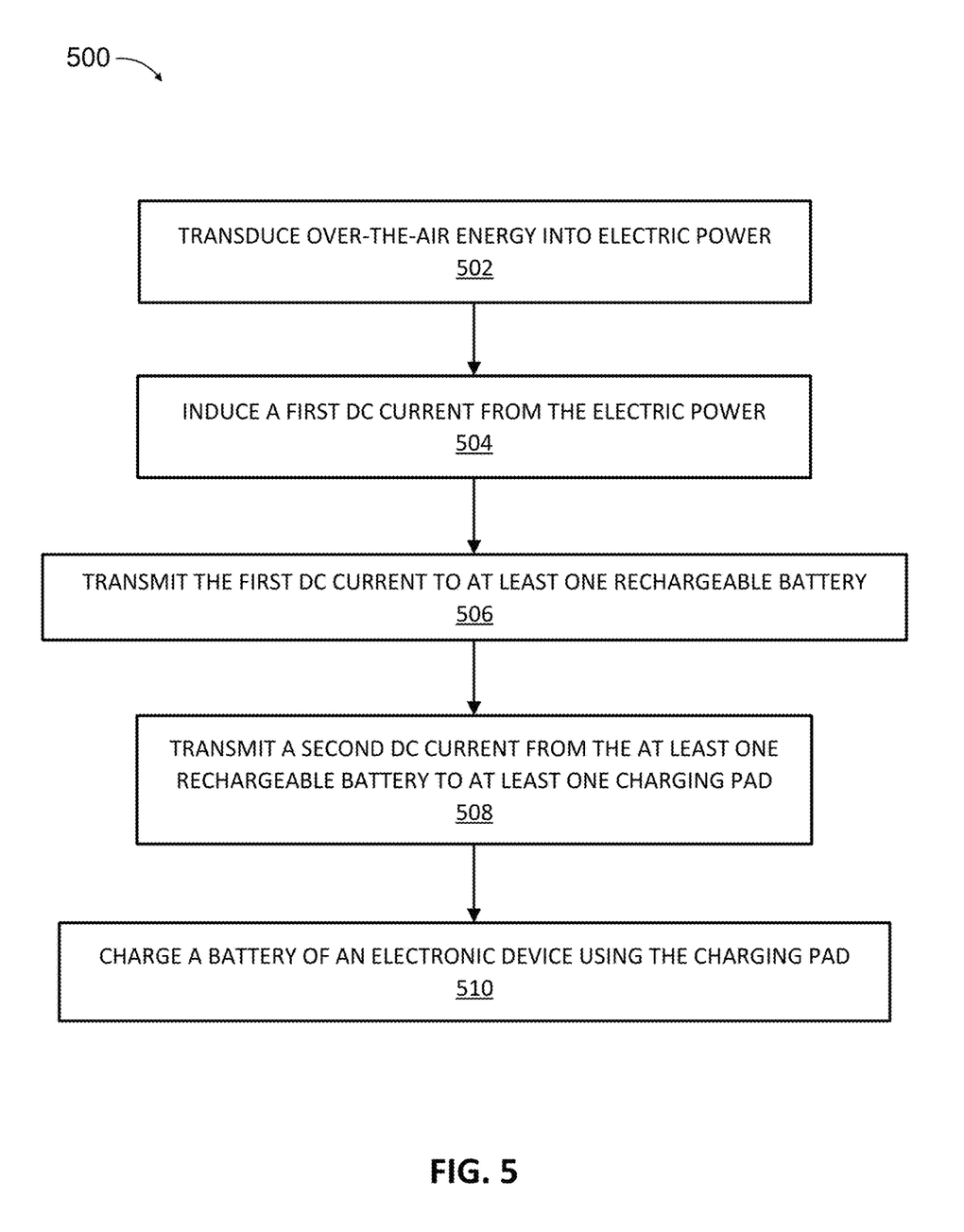
FIG. 5 depicts a flowchart of a method of using the system shown in FIG. 4, in accordance with certain embodiments of the present technology.

FIG. 5 depicts a flowchart of a method 500 of using the system 400 shown in FIG. 4, in accordance with certain embodiments of the present technology. In one embodiment, method 500 may include transducing 502 over-the-air energy into electric power. Method 500 may also include inducing 504 a first DC current from the electric power provided by the transducing 502 step. Method 500 may further include transmitting 506 the first DC current to at least one rechargeable battery (e.g., 242). Method 500 may also include transmitting 508 a second DC current from the at least one rechargeable battery to at least one charging pad (e.g., 130). The first DC current may be at a first voltage, and the second DC current may be at a second voltage that is different from the first voltage. In some embodiments, method 500 may additionally include the step of charging 510 a battery of an electronic device (e.g., smartphone 414) using the at least one charging pad.

Figure 6:
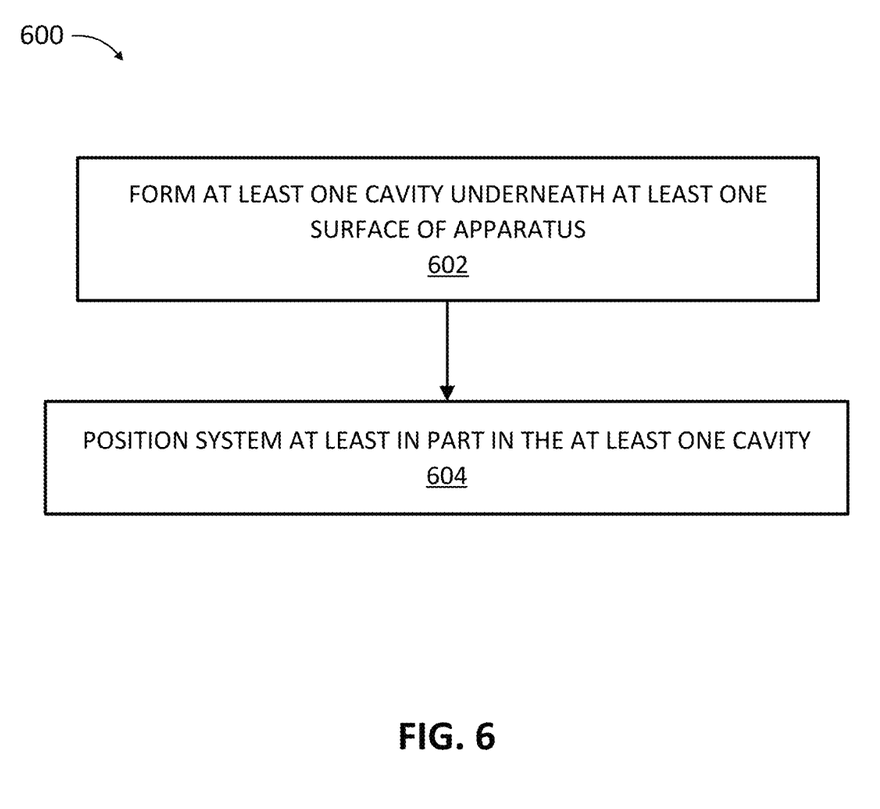
FIG. 6 depicts a flowchart of a method of manufacturing an apparatus, in accordance with certain embodiments of the present technology.

FIG. 6 depicts a flowchart of a method 600 of manufacturing an apparatus, in accordance with certain embodiments of the present technology. In one embodiment, method 600 may include forming 602 at least one cavity underneath at least one surface of the apparatus. Method 600 may also include positioning 604 a system (e.g., system 400 as described in greater detail above) at least in part in the at least one cavity.

Figure 7:
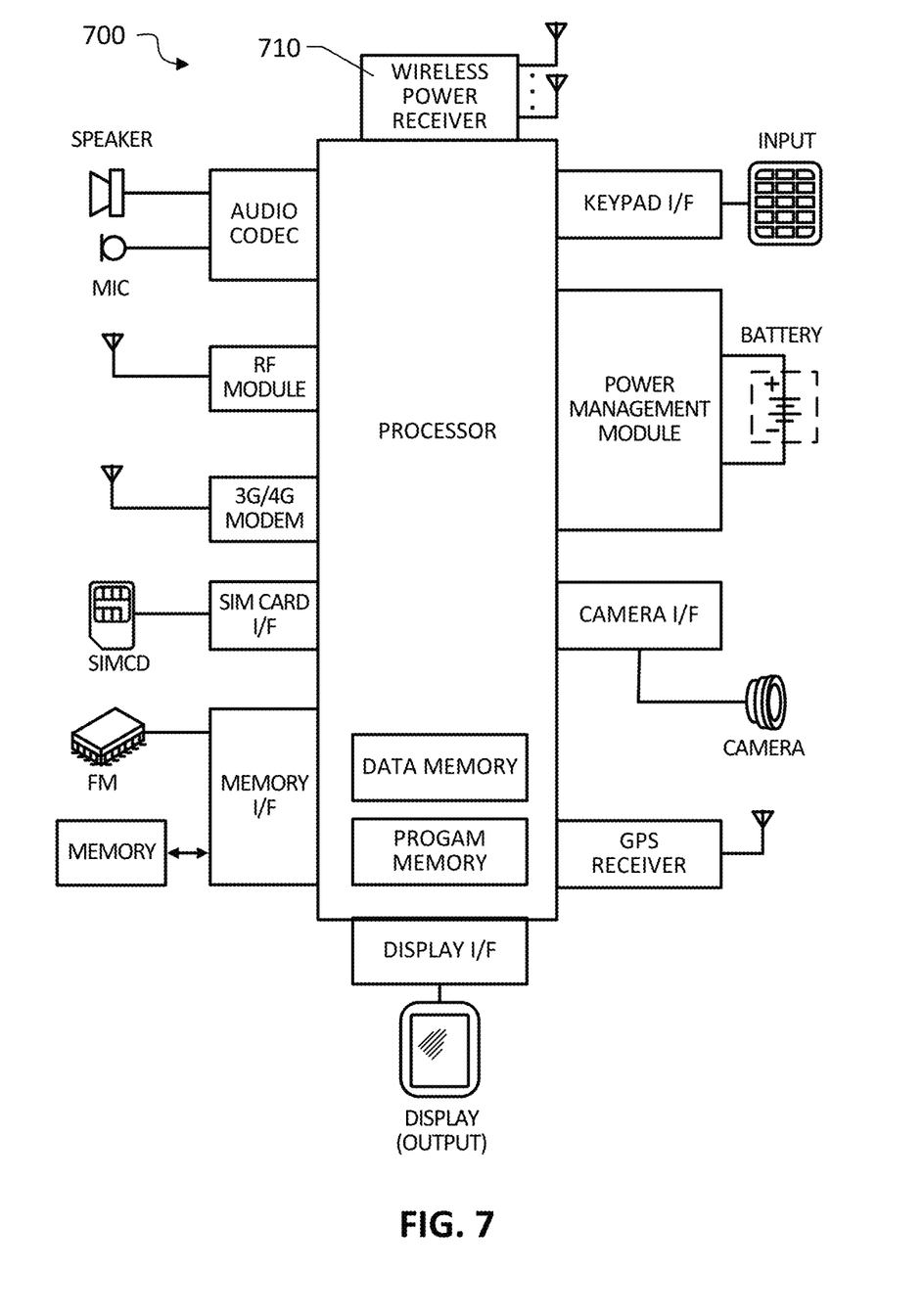
FIG. 7 is a block diagram of a computing device with a wireless power receiver, in accordance with certain embodiments of the present disclosure.

FIG. 7 depicts a block diagram of a computing device 700 with a wireless power receiver 710, in accordance with certain embodiments of the present disclosure. Computing device 700 includes any form of a computer with a wireless power receiver 710, such as a mobile (or smart) phone, tablet computer device, desktop computer device, laptop computing device, wearable computing device, or any other computing device for which wireless power charging could be applicable, in accordance with various embodiments herein. The wireless power receiver 710 may be implemented as part of the system 400, as described above with reference to FIG. 4. Further, wireless power receiver 710 may execute and perform any of the methods and functions described herein according to the present technology and with reference to the system 400 and the various components thereof.

Various interfaces and modules are shown in or coupled to the computing device 700; however, computing device 700 does not require all of such modules or functions for performing the functionality described herein. It is appreciated that, in many embodiments, various components are not included or necessary for operation of the respective computing device. For example, components such as global positioning system (GPS) radios, cellular radios, SIM cards, cameras, and accelerometers, as well as other components, may not be included in some implementations of a computing device. Further, one or more of the components or modules shown may be combined or removed.

For example, with the wireless power receiver 710 implemented, the battery, power management module, or both may be redundant in some embodiments, such as if all power management functions for the computing device 700 are built into the wireless power receiver 710. Further, a battery might not be necessary in embodiments that receive constant power via the wireless power receiver 710.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments can be made, and other embodiments not specifically described herein will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus for charging a portable electronic device, the system comprising:
   (i) a piece including:
      a top surface accessible by a user of the portable electronic device;
      at least one charging pad configured, and positioned sufficiently with respect to top surface, to charge the portable electronic device via wireless power transfer when the portable electronic device is placed on at least a portion of the top surface;
      at least one outlet or port accessible to the user and configured to charge the portable electronic device via a wired electrical connection; and
      a technology layer positioned at least in part underneath the top surface; and
   (ii) a subsystem positioned at least in part in the technology layer and comprising:
      at least one rechargeable battery configured to provide an output voltage ($V_{bat}$);
      a receiver configured to:
         receive the over-the-air energy from at least one source of the over-the-air energy; and
         transduce the over-the-air energy to electric power;
      a communications interface configured to transmit a signal to the at least one source to thereby cause the at least one source to provide the over-the-air energy retrodirectively to a location of the receiver;
      an energy harvester circuit operably coupled to and between the at least one rechargeable battery and the receiver, and configured to charge the at least one rechargeable battery using the electric power provided by the receiver; and
      at least one power converter operably coupled to the rechargeable battery and further coupled to the charging pad and the outlet or port, the at least one power converter configured to:
         convert $V_{bat}$ to a first voltage ($V_{outlet}$) for use by the outlet or port; and
         convert $V_{bat}$ to a second voltage ($V_{pad}$) for use by the charging pad, wherein $V_{outlet}$ does not equal $V_{pad}$.

2. The apparatus of claim 1, wherein the piece is, or is a part of, a furniture item.

3. The apparatus of claim 2, wherein:
   the furniture item is a table, and wherein the piece is, or is a part of, a tabletop of the table; or
   the furniture item is a chair, and therein the piece is, or is a part of, an armrest of the chair.

4. The apparatus of claim 1, wherein:
the piece is, or is a part of, a countertop;
the piece is, or is a part of, a shelf; or
the piece is, or is a part of, a windowsill.

5. The apparatus of claim 1, wherein the piece is, or is a part of, an accessory for furniture.

6. The apparatus of claim 5, wherein:
the accessory is a tablecloth, and wherein the piece is, or is a part of, the tablecloth; or
the accessory is a lazy susan, and wherein the piece is, or is a part, the lazy susan.

7. The apparatus of claim 1, wherein the at least a portion of the top surface is flat and upward facing.

8. The apparatus of claim 1, wherein the charging pad is further configured to charge the portable electronic device via wireless power transfer according to the Qi standard.

9. The apparatus of claim 1, wherein the technology layer includes a cavity, and wherein the subsystem is at least in part positioned inside the cavity.

10. The apparatus of claim 1, wherein the interior of the cavity is weatherproof or water resistant.

11. The apparatus of claim 1, wherein the receiver is further configured to transduce the over-the-air energy received the from at least one source in the form of: infrared-, laser-, light-, ultrasound-, vibration-, magnetic field-, or electromagnetic field-based over-the-air energy.

12. The apparatus of claim 1, wherein the receiver is further configured to transduce the over-the air energy received from the at least one source in the form of radio frequency (RF)-based wireless power signals, and wherein the apparatus further comprises at least one RF antenna operably coupled to the receiver.

13. A system for charging a portable electronic device, the system comprising:
at least one of the apparatus according to claim 1; and
at least one source of the over-the-air energy configured, and positioned with respect to the receiver of the subsystem of the apparatus, to provide the over-the-air energy to the receiver for use thereby.

14. The system of claim 13, wherein the at least one apparatus comprises a plurality of apparatuses.

15. The system of claim 13, wherein the at least one source comprises a plurality of sources.

16. The system of claim 13, wherein the at least one source is further configured to provide the over-the-air energy to the receiver in the form of: infrared-, laser-, light-, ultrasound-, vibration-, magnetic field-, or electromagnetic field-based over-the-air energy.

17. The system of claim 16, wherein the receiver is further configured to transduce the over-the-air energy received from the at least one source in the form of: infrared-, laser-, light-, ultrasound-, vibration-, magnetic field-, or electromagnetic field-based over-the-air energy.

18. The system of claim 13, wherein the at least one source is further configured to provide the over-the-air energy to the receiver in the form of RF wireless power signals, and wherein the at least one source includes at least one RF antenna configured to transmit the RF wireless power signals to the receiver.

19. The system of claim 18, wherein the receiver is further configured to transduce the over-the air energy received from the at least one source in the form of the RF wireless power signals, and wherein the apparatus further comprises at least one RF antenna operably coupled to the receiver.

20. A facility including the system of claim 13.

21. A method for charging a portable electronic device, the method comprising:
transmitting, by a communications interface, a signal to at least one source of over-the-air-energy;
receiving, by a receiver and in response to transmitting the signal, the over-the-air energy from the at least one source;
wherein the over-the-air energy is received retrodirectively from the at least one source to a location of the receiver and in response to transmitting the signal;
transducing, the over-the-air energy to electric power; provide an output voltage ($V_{bat}$);
charging, using the electric power, at least one rechargeable battery configured to provide an output voltage ($V_{bat}$);
convert $V_{bat}$ to a voltage ($V_{pad}$) for use by a charging pad configured, and positioned sufficiently with respect to a top surface accessible by a user of the portable electronic device, to charge the portable electronic device via wireless power transfer when the portable electronic device is placed on at least a portion of a surface of a structure; and
initiating the wireless power transfer to the portable electronic device upon the portable electronic device being placed on the at least a portion of the surface.

22. The method of claim 21 further comprising converting $V_{bat}$ to another voltage ($V_{outlet}$) for use by an outlet or port accessible to the user and configured to charge the portable electronic device via a wired electrical connection, wherein $V_{outlet}$ does not equal $V_{pad}$.

23. A method of manufacturing an apparatus for charging a portable electronic device, the method comprising:
providing a piece having a top surface accessible by a user of the portable electronic device;
positioning at least one charging pad sufficiently with respect to the top surface to charge the portable electronic device via wireless power transfer when the portable electronic device is placed on at least a portion of the top surface;
providing a technology layer at least in part underneath the top surface;
assembling a subsystem for placement into the technology layer, wherein the assembling step comprises:
coupling an energy harvester circuit to and between:
a receiver for receiving over-the-air-energy and transducing the over-the-air-energy to electric power; and
at least one energy storage device for storing the electric power; and
coupling at least one power converter to the at least one energy storage device;
placing the subsystem, and a communications interface configured to transmit a signal to at least one source of the over-the-air-energy to thereby cause the at least one source to responsively provide the over-the-air energy retrodirectively to a location of the receiver, into the technology layer; and
coupling the power converter to the charging pad.

24. The method of claim 23 further comprising coupling the at least one power converter to at least one outlet or port accessible to the user to charge the portable electronic device via a wired electrical connection.

25. The method of claim 23, wherein the piece is, or is a part of:
- a furniture item;
- a countertop;
- a shelf; or
- a windowsill.

* * * * *